Figure 1:
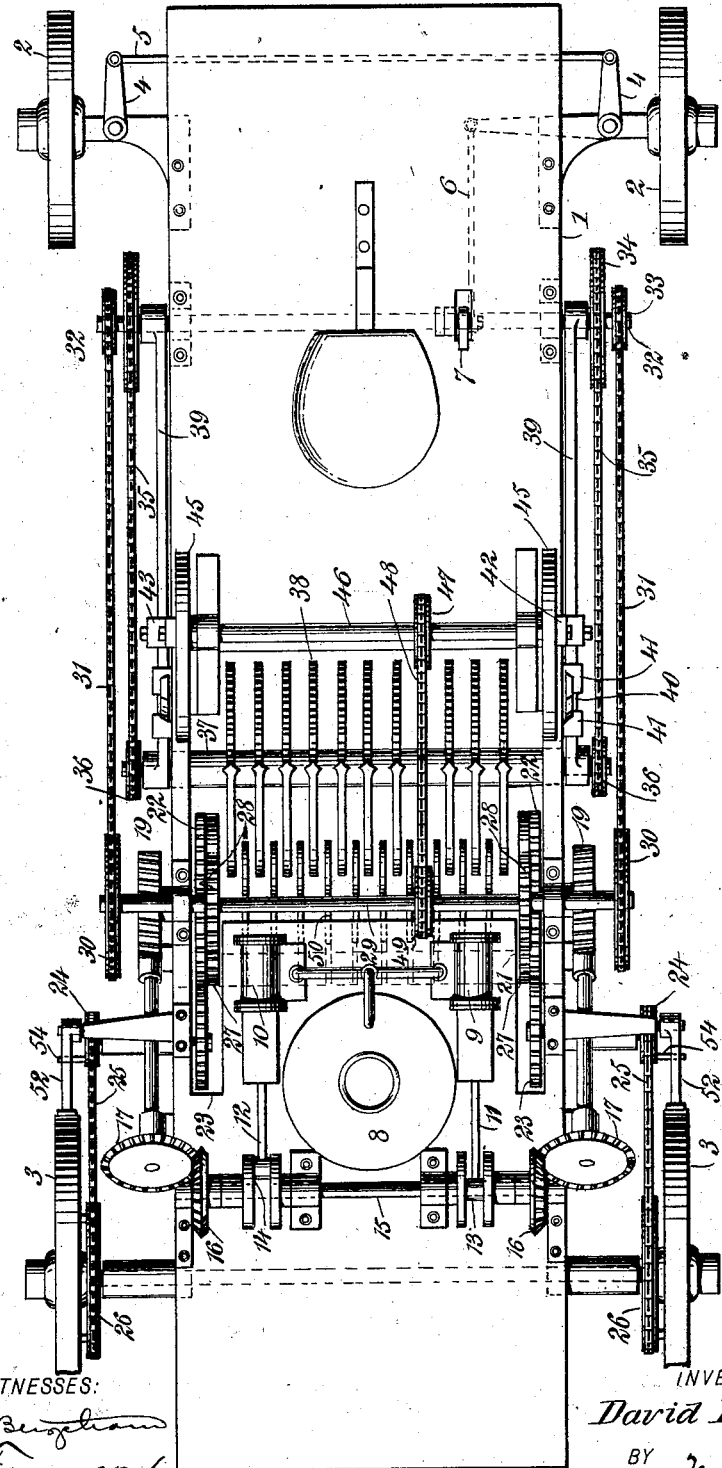

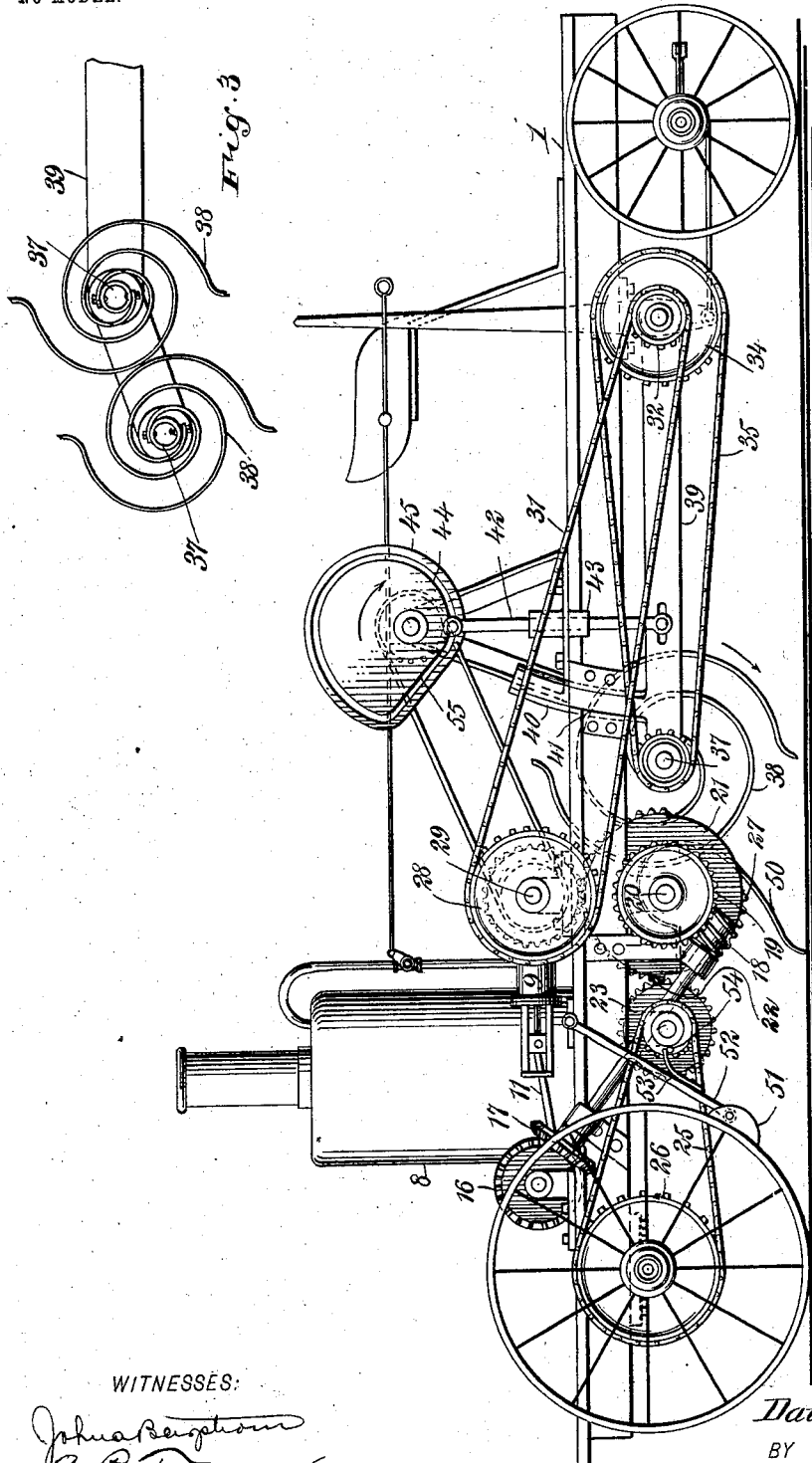

UNITED STATES PATENT OFFICE.

DAVID LUBIN, OF NEW YORK, N. Y.

AGRICULTURAL MACHINE.

SPECIFICATION forming part of Letters Patent No. 721,584, dated February 24, 1903.

Application filed August 5, 1902. Serial No. 118,471. (No model.)

*To all whom it may concern:*

Be it known that I, DAVID LUBIN, a citizen of the United States, and a resident of the city of New York, borough of Manhattan, in the county and State of New York, have invented a new and Improved Agricultural Machine, of which the following is a full, clear, and exact description.

This invention relates to improvements in agricultural machines operated by a steam or other motor; and the object is to provide, in connection with a machine of this character, a rotary digging-tool of novel construction and means operated by the motor for moving the vehicle forward at predetermined distances to rotate the tool and at the same time cause it to gradually enter the ground to the desired depth.

Other objects of the invention will appear in the general description.

I will describe an agricultural machine embodying my invention and then point out the novel features in the appended claims.

Reference is to be had to the accompanying drawings, forming a part of this specification, in which similar characters of reference indicate corresponding parts in all the figures.

Figure 1 is a plan view of an agricultural machine embodying my invention. Fig. 2 is a side elevation thereof, and Fig. 3 is a detail showing a slight modification in the digging-tool.

The carriage or vehicle comprises a platform 1, mounted on the front wheels 2 and the rear wheels 3. The front wheels are mounted on pivoted spindles, from which arms 4 extend forward, the opposite arms being connected by a rod 5, and from an inwardly-extended portion of one of the spindles a rod 6 extends to a steering-lever 7.

Mounted on the vehicle is a motor, here shown as consisting of a steam-boiler 8, having connection with cylinders 9 10, the pistons 11 12 of which engage the cranks 13 14 on the driving-shaft 15. On the ends of the driving-shaft are bevel-gears 16, which mesh with bevel-gears 17, the shafts of which extend downward and forward in suitable bearings, and on the lower ends of the shafts are worms 18, which engage with worm-wheels 19 on a counter-shaft 20. Also mounted on the counter-shaft 20 are mutilated gears 21. Each gear has two sets of segmental teeth, the outer set 22 being designed to engage at a certain time with gear-wheels 23, mounted on short shafts having bearings in the side portions of the platform or frame. On the outer ends of these short shafts are sprocket-pinions 24, from which chains 25 extend to sprocket-gears 26, attached to the rear wheels 3. The inner teeth 27 of the mutilated gears are designed at a certain time to engage with pinions 28 on a shaft 29, which operates the digging-tool, as will be hereinafter described.

On the outer ends of the shaft 29 are sprocket-wheels 30, from which chains 31 extend to sprocket-pinions 32 on a shaft 33, and also connected to this shaft 33 are sprocket-wheels 34, engaged by chains 35, said chains also engaging with sprocket-pinions 36 on a shaft 37, carrying the digging-tools. These digging-tools as here shown consist of a plurality of sets of spirally-disposed spring-yielding teeth 38. While I have shown two teeth in a set, it is to be understood that a greater number may be employed, if desired. The object in making the teeth of this particular construction and of yielding material is to permit a slight yielding should they strike a stone or other obstruction, and therefore not be liable to be broken. The shaft 37 has its bearings in arms 39, the forward portions of which are mounted to swing, as here shown, on the shaft 33. Segmental arms 40 extend upward from the arms 39 and move in guides 41, and from each arm 39 a draw-rod 42 extends upward through a guide 43, and a wrist-pin on the upper end of each rod 42 engages in a cam-slot 44 of a cam-wheel 45. The said cam-wheels are mounted on a shaft 46. From a sprocket-wheel 47, mounted on the same, a chain 48 extends to a sprocket-wheel 49 on the shaft 29.

Rearward of the digging-tool are spring-yielding breaking and smoothing tines 50. These breaking and smoothing tines are attached to a cross-bar supported on the vehicle by means of suitable hangers and are curved upward, then forward and downward, to engage lightly on the surface of the ground, and also the forward projection is such that material will be forced between the tines by the rotating digger and finely pulverize any clogs of earth that may be carried up with said digger.

It is necessary that while the digging-tool is operating the vehicle shall be at a standstill, and to prevent any possible movement thereof by the influence of the digger operating in the ground I provide brakes, here shown as consisting of shoes 51, designed to engage with the rear wheels of the vehicle. These shoes are mounted on swinging arms 52, and on the swinging arms are forwardly-curved spring-fingers 53, designed to be engaged by pins 54, carried by the pinions 24.

In the operation when the vehicle is at a standstill the teeth of the mutilated gears, engaging with the gear-wheels 28 and through the other chain of gearing leading to the digging-tool, will cause said digging-tool to rapidly rotate, it being understood, of course, that the motor is at all times in action. The normal position of the digging-tool when in operation is of course above the surface of the ground. During its rotary movement the spirally-disposed cam-slots of the cam-wheels 45 will cause the digging-tool to move slowly downward, so that the succeeding teeth will dig gradually into the ground to the proper depth—say a depth of eight inches. After making the necessary rotations the digging-tool will be quickly raised by the practically straight portions 55 of the cam-slots. When the digging-tool starts into action, the pins 54 will engage with the spring-fingers 53 and force the shoes 51 into engagement with the driving-wheels, thus preventing any possible forward movement of the vehicle. After the complete operation of the digging-tool the teeth of the mutilated gears will engage with the gear-wheels 23, which will start the driving mechanism for the vehicle. As soon as this is started the pins 54 will wipe over the ends of the fingers 53, releasing the brake-shoes. The teeth of the mutilated gear are so arranged as to drive the carriage forward just a sufficient distance for the next cut or operation of the digging-tool.

In Fig. 3 I have shown two digging-tools, one arranged forward of the other, the front one being on a higher plane than the rear one. By this arrangement after starting the machine the front tool while lowering will cut a short distance into the ground—say four inches—and the rear tool will complete the cut started by the front one to the desired depth. This arrangement will permit of the employment of cams having half the throw of the cams as first described.

Having thus described my invention, I claim as new and desire to secure by Letters Patent—

1. An agricultural machine comprising a carriage, a motor mounted on the carriage, means actuated by the motor for moving the carriage, a rotary digging-tool mounted on the carriage, and means actuated by the motor for causing a rotary movement of said digging-tool and also for causing a vertical movement thereof while the carriage is at a standstill.

2. An agricultural machine comprising a carriage, a motor mounted thereon, a rotary digging-tool on the carriage and comprising spirally-disposed yielding tines, and means actuated by the motor for alternately moving the carriage and actuating the digging-tool.

3. An agricultural machine comprising a carriage, a motor mounted thereon, a rotary digging-tool comprising spirally-disposed spring-yielding tines or teeth, a driving connection between the motor and carriage, a driving connection between the motor and digging-tool, and means for changing the operative connection between the motor and said parts so as to cause a forward movement of the carriage and then an operation of the digging-tool.

4. In an agricultural machine a carriage, a motor mounted thereon, a digging-tool mounted to rotate and having a vertical movement, cams operated from the motor for causing said vertical movement, driving connections between the motor and digging-tool, and driving connections between the motor and carriage.

5. In an agricultural machine a carriage, a rotary digging-tool mounted on the carriage and comprising spirally-disposed tines or teeth, breaking and smoothing tines rearward of said digging-tines, a motor on the carriage, and means operated by the motor for alternately moving the carriage and operating the digging-tool.

6. In an agricultural machine a carriage, a motor mounted on the carriage, a driving connection between the motor and carriage, a rotary shaft, swinging arms in which said shaft has its bearings, digging-tines carried on said shaft, cams supported on the carriage, connections between said cams and the arms, driving connection between the motor and the shaft, and driving connection between the motor and the cams.

In testimony whereof I have signed my name to this specification in the presence of two subscribing witnesses.

DAVID LUBIN.

Witnesses:
D. L. WEEKS,
CHARLES L. WEEKS.